United States Patent
Steele et al.

[11] Patent Number: 6,119,977
[45] Date of Patent: Sep. 19, 2000

[54] FLUID CONTAINER WITH SELF-SEALING CAPABILITY

[75] Inventors: Roger H. Steele, East Littlerock; Robert Baumgartner, Newhall, both of Calif.

[73] Assignee: Lockheed Martin Corporation, Palmdale, Calif.

[21] Appl. No.: 09/314,830

[22] Filed: May 19, 1999

[51] Int. Cl.[7] ...................................................... B64B 1/02
[52] U.S. Cl. ................................................ 244/30; 31/33
[58] Field of Search .................................. 244/30, 31, 33, 244/128, 121, 129.1, 98

[56] References Cited

U.S. PATENT DOCUMENTS

| | | | |
|---|---|---|---|
| 993,948 | 5/1911 | Bernegger | 244/128 |
| 1,270,971 | 7/1918 | Richmond | 244/128 |
| 1,860,555 | 5/1932 | Schlosser | 244/128 |
| 2,156,610 | 7/1939 | Boyle | 244/98 |
| 4,982,915 | 1/1991 | Brotz | 244/98 |

FOREIGN PATENT DOCUMENTS

| | | | |
|---|---|---|---|
| 546107 | 3/1932 | Germany | 244/128 |
| 2196919 | 5/1988 | United Kingdom | 244/128 |

*Primary Examiner*—Galen L. Barefoot
*Attorney, Agent, or Firm*—Robert A. Schruhl

[57] ABSTRACT

A method and apparatus for sealing ruptures in gas containing envelopes, includes a first plurality of containers filled with a gas, each of the containers being buoyant in and drifting freely within the envelope, so that when a rupture occurs in the envelope, the containers are drawn toward the rupture and collectively close and plug the rupture. Preferably, the containers are flexible walled envelopes made of gas-impermeable material.

10 Claims, 1 Drawing Sheet

FLUID CONTAINER WITH SELF-SEALING CAPABILITY

BACKGROUND OF THE INVENTION

1. Field of the Invention

The present invention relates to lighter-than-air vehicles, and more particularly to buoyant aerial vehicles having a lifting gas contained in an envelope and sealing balloonlets drifting in the lifting gas for moving toward and sealing tears or ruptures that occur in the envelope.

2. Description of the Related Art

Lighter-than-air vehicles, also known as blimps or dirigibles, have evolved as an important mode of cargo transportation in recent past years. Typically, construction includes a main envelope or pressure hull formed of a fabric which is lightweight, extremely strong and impervious to gas diffusion, as for example, laminated plastic or nylon. The envelope is typically filled with a lighter-than-air gas, such as helium or hydrogen, which imparts lift to the dirigible.

One of the problems encountered with dirigibles is how to repair, while in flight, holes or punctures in the envelope, for if not dealt with in a timely and expeditious manner, the lifting gas will escape from within the envelope and the mission and continued flight of the otherwise buoyant vehicle will be thwarted.

Several devices and techniques for sealing openings, such as rips or punctures, in container walls have been proposed. For example, U.S. Pat. No. 4,088,240 to Miguel teaches attaching a layer of carpet-like material to the inner surface of a fuel tank to permit fibers of the carpet-like material to "flow" into, and thereby effectively "seal", the hole or puncture. Similarly, U.S. Pat. No. 4,422,561 to Grosvenor et al. teaches providing a plurality of fronds permanently attached to tank walls so that the fronds cumulatively move toward an opening or puncture to plug the hole. Other mechanisms for plugging or patching holes in tank walls or other similar structures are disclosed by U.S. Pat. No. 2,422,797 to Pfleumer (sealant layer that flows toward and plugs an opening), U.S. Pat. No. 3,666,133 to Benning (photocurable sealant in wall capable of flowing into and sealing wall openings), and U.S. Pat. No. 3,291,333 to House (two layers of sealant which flow into and seal wall openings). Mechanisms for the intentional deflation of airships are disclosed by U.S. Pat. No. 4,033,527 to Parsons and U.S. Pat. No. 4,432,513 to Yost.

Against this background of known technology, the applicant has developed a new method and apparatus for sealing ruptures in a main envelope filled with a lifting gas. A preferred method entails providing a plurality of small envelopes or balloons, hereinafter referred to as "balloonets", inside the main envelope which preferably are filled with a gas that is lighter than the gas inside the envelope. When a rupture in the main envelope occurs, the balloonets float toward the rupture to plug and seal it from further leakage of the lifting gas.

OBJECTS AND SUMMARY OF THE INVENTION

It is therefore an object of the present invention to provide a novel method and apparatus for sealing envelopes of dirigible-type air vehicles that are filled with lighter-than-air lifting gas, which will overcome many of the disadvantages and drawbacks of similar air vehicles known in the art.

Another object of the present invention is to provide apparatus for sealing an envelope containing lighter-than-air lifting gas which is capable of escaping from the envelope if the latter develops a puncture or tear, the apparatus including a plurality of small balloons filled with a gas that Is lighter than the lifting gas so that the small balloons float about the envelope in the lifting gas until a rupture occurs in the envelope whereupon the small balloons float to and seal the rupture against further leakage of the lifting gas from the envelope.

Still another object of the invention is to provide apparatus for sealing an envelope containing a first fluid, the fluid being capable of escaping from the envelope if the latter develops a rupture, the apparatus including a first set of small balloons filled with a second fluid that renders the balloons positively buoyant so that they drift freely within the envelope and a second set of small balloons containing a third fluid that renders them negatively buoyant in the envelope so that they fall to the bottom of the envelope.

Still another object of the invention is to provide balloonlets inside a gas impermeable envelope of a dirigible which are buoyant in the envelope and covered with an adherent agent, such as Velcro or blaze orange, so that if a rupture occurs in the envelope, the balloon-lets will float toward and adhere to the inner wall of the envelope in the vicinity of the rupture, thereby effectively sealing the rupture.

Other objects, advantages and features of the invention will become more apparent, as will equivalent structures which are intended to be covered herein, with the teaching of the principles of the invention in connection with the disclosure of the preferred embodiments thereof in the specification, claims and drawings in which:

DETAILED DESCRIPTION OF THE INVENTION

Figure 1:
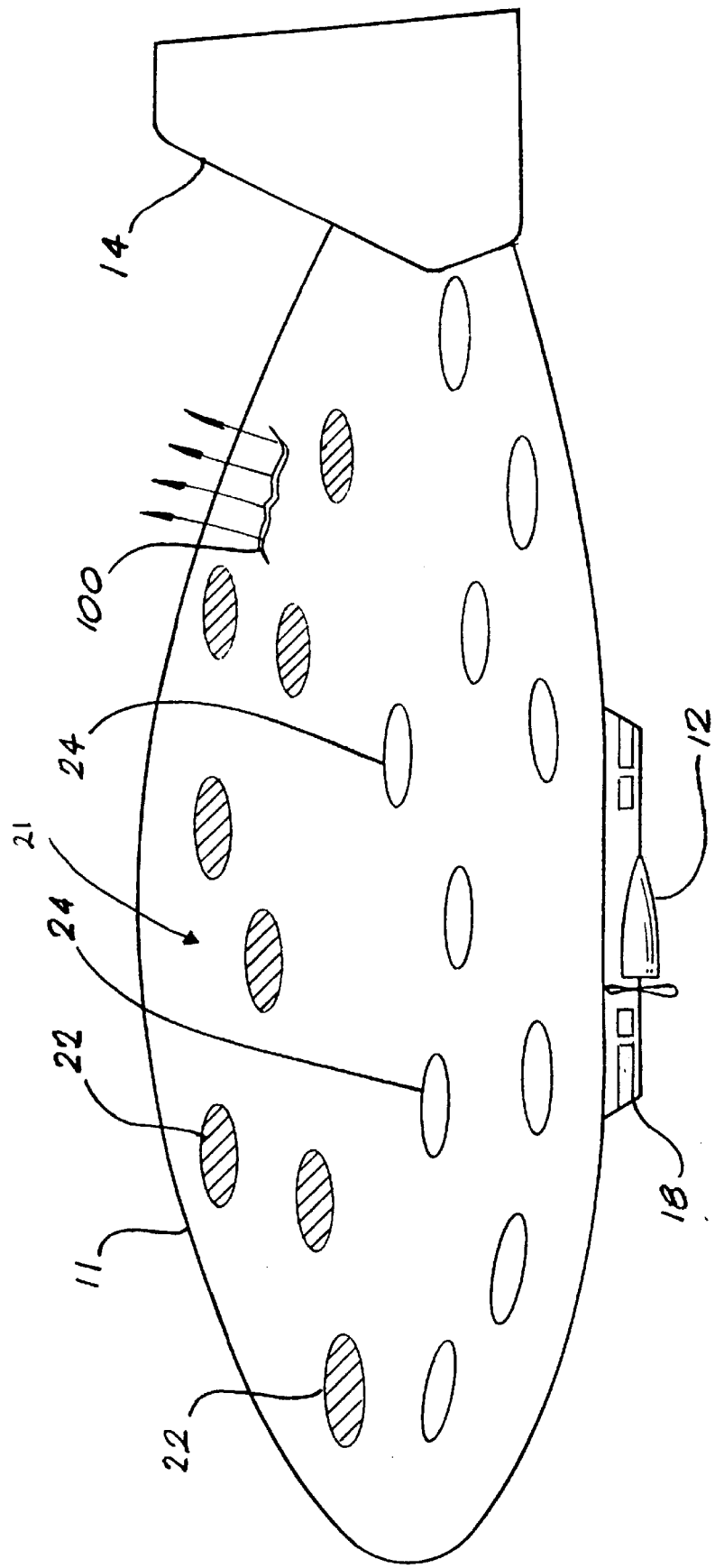
FIG. 1, the sole drawing FIGURE, is a schematic view of a dirigible illustrating the principals of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an ultra large, yet novel, air vehicle that encompasses many long sought after features that make transport of extremely large payloads easier and less expensive.

The present invention is an apparatus and method useful with air vehicles of the type that are typically buoyant, such as dirigibles or balloons. FIG. 1 shows a conventional dirigible, which includes a lifting body 11, propulsion means 12 located on some portion of the lifting body, one or more vertically arranged rudders 14, a flight/crew station 18, and landing gear (not shown).

The lifting body is defined by an envelope 21 comprising a pliable, gas impermeable, shell filled with a lifting gas, as for example hydrogen. Inside the envelope 21 are a plurality of small balloons, or "balloon-lets", 22. Preferably, the balloon-lets are approximately neutrally buoyant in the lifting gas, such as helium. The balloon-lets become neutrally buoyant as the lifting gas becomes contaminated with air. The balloon-lets 22 freely drift on the currents within the lifting gas in the envelope. When a rupture 100 in the envelope occurs, the lifting gas will flow toward, and escape from, the envelope rupture thereby causing further gas currents. As the balloon-lets are drawn by the escaping gas currents to the rupture, each will contributorily cover or clog, and collectively plug, the rupture to effectively seal the rupture against further leakage until a permanent repair can be made.

In another embodiment, some of the balloon-lets 24 could be filled with helium, rather than hydrogen. These other balloon-lets 24 would be negatively buoyant in the helium environment and would lie on the bottom of the envelope. As the large leaks expel helium and allow major contamination of the envelope with air, the hydrogen filled balloon-lets 22 will become positively buoyant and stick to the roof of the envelope, and become less mobile. But then the helium filled balloon-lets would then become neutrally buoyant and float into the gas-expelling rupture(s).

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What I claim is:

1. Apparatus for sealing ruptures in gas containing envelopes, comprising:

a first plurality of containers filled with a gas, each of said containers being buoyant in said envelope gas and drifting freely in said envelope, whereby when a rupture occurs in said envelope, said containers are drawn toward said rupture closing and plugging said rupture.

2. The apparatus of claim 1, wherein said containers comprise flexible walled envelopes.

3. The apparatus of claim 1, wherein said envelope and containers comprise gas impermeable material.

4. The apparatus of claim 1, wherein the gas in said containers comprises hydrogen.

5. The apparatus of claim 1, wherein the gas in said containers comprises helium.

6. The apparatus of claim 1, wherein said containers are negatively buoyant in said gas in said envelope.

7. A method for sealing a rupture in an envelope holding a first fluid, said method comprising:

providing a plurality of small containers, at least some of said containers being filled with a second fluid that renders said containers buoyant in said envelope, and placing said plurality of small containers in said envelope, whereby said containers drift freely in said envelope until a rupture occurs, whereupon said containers will be drawn toward, and plug, said rupture.

8. The method of claim 7, wherein said first and second fluids are gases, and said containers comprise a flexible wall.

9. The method of claim 8, wherein said gases are H & He, respectively, and said wall of said containers comprise a gas-impermeable membrane.

10. The method of claim 7, and including the further step of providing other containers filled with a third fluid that renders said other containers negatively buoyant in the envelope.

* * * * *